No. 858,016. PATENTED JUNE 25, 1907.
V. PATTON.
ARMATURE TESTING APPARATUS.
APPLICATION FILED MAY 24, 1906.
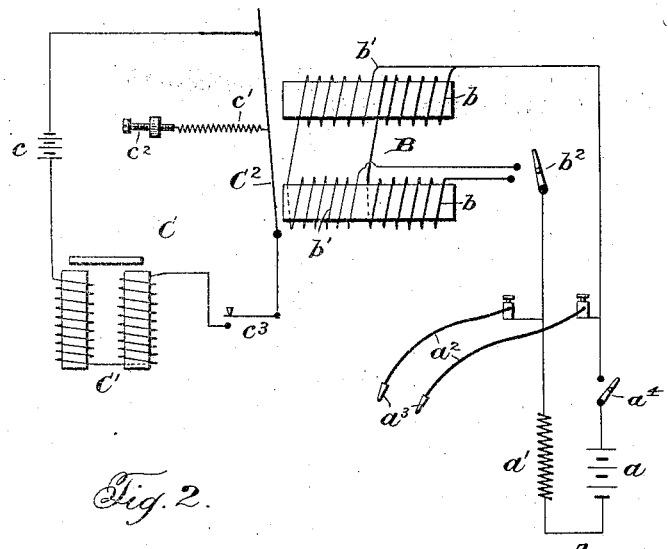
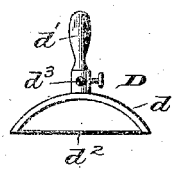
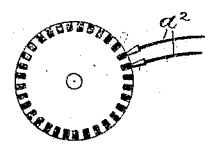 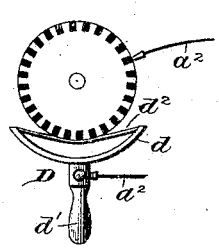 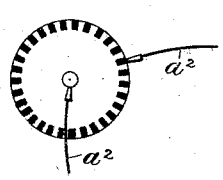
Witnesses:
Inventor:
Victor Patton.

UNITED STATES PATENT OFFICE.

VICTOR PATTON, OF HASTINGS, COLORADO.

ARMATURE-TESTING APPARATUS.

No. 858,016.  Specification of Letters Patent.  Patented June 25, 1907.

Application filed May 24, 1906. Serial No. 318,546.

*To all whom it may concern:*

Be it known that I, VICTOR PATTON, a citizen of the United States, residing at Hastings, in the county of Las Animas and State of Colorado, have invented certain new and useful Improvements in Armature-Testing Apparatus, of which the following is a specification.

This invention relates to an improvement in apparatus for testing armature windings and the object of the invention is the provision of a simple and efficient device of this character by the employment of which "shorts", "grounds", "cross" and other defects in the armature winding can be readily detected and located.

A further object of the invention is the provision of an apparatus of this character which can be readily adapted for use in testing armatures of either high or low resistance.

A further object of the invention is the provision of an improved testing terminal of particular efficiency for locating "cross" circuits.

Other objects of the invention will be apparent from the detailed description hereinafter, when read in connection with the accompanying drawings forming a part hereof, wherein a preferable embodiment of my invention is shown and wherein like numerals of reference refer to similar parts in the several views.

In the drawings: Figure 1 is a diagrammatic view of my improved testing apparatus. Fig. 2 is a detail view of the testing terminal used for locating "cross" circuits, and Figs. 3, 4 and 5, are diagrammatic views showing the manner of locating "shorts", "cross", and "grounds."

Referring now more particularly to the drawings, A designates a test circuit in which is positioned a suitable battery or batteries $a$ and resistance $a'$ to render the action of the batteries uniform.

B designates a relay, which may be of any suitable construction, and which is provided with two separate windings one $b$ of heavy wire and the other $b'$ of fine wire, either of which may be connected to the test circuit A by a switch $b^2$. Extending from the wires of the test circuit are the test wires or cords $a^2$ which terminate in the metal terminals $a^3$. A hand switch $a^4$ of any suitable construction is interposed in the test circuit for cutting out the batteries thereof.

C designates a local signaling circuit in which is positioned a suitable battery $c$ and a sounder or other suitable signaling device C'. The local signaling circuit is normally closed by a pivoted circuit closer $C^2$ which also constitutes the armature of the relay B in the test circuit. A spring $c'$ which is provided with a suitable tension regulating screw $c^2$ serves to hold the armature normally away from its magnet and consequently close the circuit C. A hand switch $c^3$ of any suitable construction is interposed in the signaling circuit C.

D designates a terminal which is particularly efficacious for locating "crosses". This terminal comprises a bow-shaped metallic portion $d$ which is secured to a handle $d'$ and to the extremities of which are secured the ends of a flexible metallic ribbon $d^2$. In use, the terminal D is held by its handle with the ribbon $d^2$ thereof in contact with the outer portion of the commutator so that the ribbon, owing to its flexibility, will contact with a plurality of the segments thereof. The lower portion of the handle $d$ of the terminal D which is formed of metal, is provided with a transversely disposed aperture $d^3$ therein, which is adapted to receive one of the terminals $a^3$ of the test circuit A, said terminal being secured therein by a set screw or other suitable fastening means.

While in the drawings I have shown only a diagrammatic representation of my apparatus, it is of course obvious that the parts thereof are to be assembled in any preferred manner and housed in the case which may be readily transported from place to place for use.

Having described the construction of my improved apparatus, I will now set forth the manner of using the same.

The windings $b$ or $b'$ of the relay are connected to the test circuit by the switch $b^2$, accordingly as the armature to be tested is one of high or low resistance.

To test for a short circuit, the test terminals $a^2$ are placed on segments side by side of the commutator, as in Fig. 3, and the armature spring is adjusted so that when the terminals occupy this position the armature $C^2$ will be attracted by its relay B holding the signaling circuit open. The terminals $a^2$ are then moved across the commutator and when the "short" is located, the relay will be short circuited which will cause the release of its armature and consequently the closing of the signaling circuit.

To test for a "cross," the terminal D is secured to one of the test terminals $a^3$ and is held so that the flexible ribbon $d^2$ thereof will contact with several of the segments thereof, as shown in Fig. 4. The opposite test terminal $a^2$ is then held against the periphery of the commutator and after the relay has been adjusted in the same manner, as for the "short" test, the terminals D and $a^2$ are moved around the commutator until the "cross" is located.

To test for a "ground," adjust relay so that it will attract its armature and open the signaling circuit when the test terminals $a^2$ are placed on two of the commutator segments; then place one terminal $a^2$ on shaft and move the other around commutator, as shown in Fig. 5 until signaling circuit is closed and sounder clicks.

To locate a particular coil on armature, adjust the armature spring so that when the test terminals are placed in two of the commutator bars, the relay will attract the armature, place one test terminal on one bar of commutator and run the other terminal around commutator and when the same contacts the bar forming the other end of the coil, the relay will be short circuited and its armature will close the signaling circuit, thereby causing the sounder to click.

To locate an "open" adjust armature spring so that the relay will just attract its armature when the test terminals are placed on two of the commutator segments. Test around commutator one segment after the other the sounder will click each time until the "open" is located when the armature will stand attracted by its relay and signaling circuit will be held open.

I claim:
1. In an armature testing apparatus, a test circuit a relay therein, a local signaling circuit, a circuit closer therefor, said circuit closer constituting the armature of the relay in the test circuit, a spring normally serving to hold said circuit closer in a closed position, and means for adjusting the tension of said spring.

2. In an armature testing apparatus, a test circuit, a relay having a plurality of windings thereon, means for cutting either of said windings into the test circuit, and signaling means controlled by said relay.

3. In an armature testing apparatus, a test circuit, a relay having a plurality of windings thereon, means for cutting either of said windings into the test circuit, a local signaling circuit, and means controlled by the relay in the test circuit for opening and closing the signaling circuit.

4. In an armature testing apparatus, a test circuit, a relay having a plurality of windings of varying resistance thereon, a switch for cutting either of said windings into the test circuit, a local signaling circuit, and means controlled by the relay in the test circuit for opening and closing said local signaling circuit.

5. In an armature testing apparatus, a test circuit, a relay having a plurality of windings of varying resistance thereon, a switch for cutting either of said windings into the test circuit, an armature for said relay, and a local signaling circuit adapted to be opened and closed by the movement of the relay armature.

6. A terminal for armature testing apparatus having an elongated flexible contact face, whereby the same may be caused to simultaneously contact with a plurality of commutator segments.

7. A terminal for armature testing apparatus comprising a bowed portion and a flexible contact face extending thereacross.

In testimony whereof I have signed my name to this specification in the presence of two subscribing witnesses.

VICTOR PATTON.

Witnesses:
OLIVER QUINN,
C. A. FLOYD.